US008306996B2

(12) United States Patent
Nanjangud Bhaskar et al.

(10) Patent No.: US 8,306,996 B2
(45) Date of Patent: *Nov. 6, 2012

(54) PROCESSING MODEL-BASED COMMANDS FOR DISTRIBUTED APPLICATIONS

(75) Inventors: Karthik Arun Nanjangud Bhaskar, Kirkland, WA (US); Erik B. Christensen, Seattle, WA (US); Amol Sudhakar Kulkarni, Bothell, WA (US); Prasad Sripathi Panditharadhya, Sammamish, WA (US); Sundeep Sahi, Seattle, WA (US); Igor Sedukhin, Issaquah, WA (US); Haoran Andy Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,223

(22) Filed: May 18, 2011

(65) Prior Publication Data

US 2011/0219383 A1  Sep. 8, 2011

Related U.S. Application Data

(63) Continuation of application No. 11/925,079, filed on Oct. 26, 2007, now Pat. No. 7,974,939.

(51) Int. Cl.
G06F 7/00 (2006.01)
(52) U.S. Cl. ......................... 707/770; 707/782
(58) Field of Classification Search ............... 705/7.27, 705/301; 707/636, 770, 782, 797; 455/453; 718/104–105
See application file for complete search history.

(56) References Cited

U.S. PATENT DOCUMENTS

| 4,751,635 A | | 6/1988 | Kret |
| 5,327,529 A | * | 7/1994 | Fults et al. ............... 715/762 |
| 5,423,003 A | | 6/1995 | Berteau |
| 5,602,991 A | | 2/1997 | Berteau |
| 5,655,081 A | | 8/1997 | Bonnell |
| 5,764,241 A | | 6/1998 | Elliott |
| 5,809,266 A | | 9/1998 | Touma |
| 5,893,083 A | | 4/1999 | Eshghi |
| 5,913,062 A | | 6/1999 | Vrvilo et al. |
| 5,937,388 A | | 8/1999 | Davis et al. |

(Continued)

FOREIGN PATENT DOCUMENTS
EP  0733967  9/1996
(Continued)

OTHER PUBLICATIONS

Rosenblum, D., and Wolf, A. "A Design Framework for Internet-Scale Event Observation and Notification," ACM SIGSOFT Software Engineering Notes. vol. 22, Issue 6, Nov. 1997. [retrieved on Jun. 12, 2011]. Retrieved from the Internet: <URL:www.acm.org>.

(Continued)

Primary Examiner — James Trujillo
Assistant Examiner — Linh Black
(74) Attorney, Agent, or Firm — Workman Nydegger

(57) ABSTRACT

The present invention extends to methods, systems, and computer program products for processing model based commands for distributed applications. Embodiments facilitate execution of model-based commands, including software lifecycle commands, using model-based workflow instances. Data related to command execution is stored in a shared repository such that command processors can understand their status in relationship to workflow instances. Further, since the repository is shared, command execution can be distributed and balanced across a plurality of different executive services. Embodiments also include model-based error handling and error recovery mechanisms.

20 Claims, 8 Drawing Sheets

U.S. PATENT DOCUMENTS

| | | | |
|---|---|---|---|
| 5,958,010 | A | 9/1999 | Agarwal |
| 6,005,849 | A | 12/1999 | Roach et al. |
| 6,026,404 | A | 2/2000 | Adunuthula |
| 6,055,363 | A | 4/2000 | Beals et al. |
| 6,070,190 | A | 5/2000 | Reps |
| 6,167,538 | A | 12/2000 | Neufeld et al. |
| 6,185,601 | B1* | 2/2001 | Wolff .......................... 709/203 |
| 6,225,995 | B1 | 5/2001 | Jacobs |
| 6,230,309 | B1 | 5/2001 | Turner |
| 6,247,056 | B1 | 6/2001 | Chou |
| 6,263,339 | B1 | 7/2001 | Hirsch |
| 6,279,009 | B1 | 8/2001 | Smirnov et al. |
| 6,327,622 | B1* | 12/2001 | Jindal et al. ................. 709/228 |
| 6,330,717 | B1 | 12/2001 | Raverdy |
| 6,334,114 | B1 | 12/2001 | Jacobs |
| 6,336,217 | B1 | 1/2002 | D'Anjou et al. |
| 6,342,907 | B1 | 1/2002 | Petty |
| 6,415,297 | B1 | 7/2002 | Leymann et al. |
| 6,477,665 | B1 | 11/2002 | Bowman-Amuah |
| 6,505,342 | B1* | 1/2003 | Hartmann et al. ............ 717/104 |
| 6,618,719 | B1 | 9/2003 | Andrei |
| 6,640,241 | B1 | 10/2003 | Ozzie |
| 6,654,783 | B1 | 11/2003 | Hubbard |
| 6,662,205 | B1 | 12/2003 | Bereiter |
| 6,697,877 | B1 | 2/2004 | Martin |
| 6,710,786 | B1 | 3/2004 | Jacobs |
| 6,715,145 | B1 | 3/2004 | Bowman-Amuah |
| 6,718,535 | B1 | 4/2004 | Underwood |
| 6,801,818 | B2 | 10/2004 | Kopcha |
| 6,847,970 | B2 | 1/2005 | Keller et al. |
| 6,854,069 | B2 | 2/2005 | Kampe |
| 6,886,024 | B1 | 4/2005 | Fujita |
| 6,907,395 | B1 | 6/2005 | Hunt |
| 6,931,644 | B2 | 8/2005 | Riosa |
| 6,934,702 | B2 | 8/2005 | Faybishenko |
| 6,941,341 | B2* | 9/2005 | Logston et al. ............... 709/203 |
| 7,051,098 | B2 | 5/2006 | Masters |
| 7,055,143 | B2 | 5/2006 | Ringseth et al. |
| 7,065,579 | B2 | 6/2006 | Traversat |
| 7,072,807 | B2 | 7/2006 | Brown |
| 7,072,934 | B2 | 7/2006 | Helgeson |
| 7,079,010 | B2 | 7/2006 | Champlin |
| 7,085,837 | B2 | 8/2006 | Kimbrel |
| 7,096,258 | B2 | 8/2006 | Hunt |
| 7,103,874 | B2 | 9/2006 | McCollum |
| 7,130,881 | B2 | 10/2006 | Volkov et al. |
| 7,150,015 | B2 | 12/2006 | Pace et al. |
| 7,155,380 | B2 | 12/2006 | Hunt |
| 7,155,466 | B2 | 12/2006 | Rodriguez |
| 7,162,509 | B2 | 1/2007 | Brown et al. |
| 7,168,077 | B2 | 1/2007 | Kim |
| 7,174,359 | B1 | 2/2007 | Hamilton, II et al. |
| 7,178,129 | B2 | 2/2007 | Katz |
| 7,200,530 | B2 | 4/2007 | Brown |
| 7,210,143 | B2 | 4/2007 | Or et al. |
| 7,219,351 | B2 | 5/2007 | Bussler et al. |
| 7,263,689 | B1 | 8/2007 | Edwards et al. |
| 7,296,268 | B2* | 11/2007 | Darling et al. ................ 718/105 |
| 7,379,999 | B1 | 5/2008 | Zhou et al. |
| 7,383,277 | B2 | 6/2008 | Gebhard et al. |
| 7,395,526 | B2 | 7/2008 | Arcand |
| 7,403,956 | B2 | 7/2008 | Vaschillo et al. |
| 7,444,618 | B2 | 10/2008 | Kulkarni et al. |
| 7,487,080 | B1 | 2/2009 | Tocci |
| 7,512,707 | B1 | 3/2009 | Manapragada |
| 7,526,734 | B2 | 4/2009 | Vasilev |
| 7,574,497 | B2* | 8/2009 | Scheidt et al. ............... 709/223 |
| 7,702,739 | B1* | 4/2010 | Cheng et al. ................. 709/207 |
| 7,703,075 | B2 | 4/2010 | Das |
| 7,747,985 | B2 | 6/2010 | Campbell et al. |
| 7,761,844 | B2 | 7/2010 | Bove |
| 7,774,744 | B2 | 8/2010 | Moore et al. |
| 7,796,520 | B2 | 9/2010 | Poustchi et al. |
| 7,797,289 | B2 | 9/2010 | Chan et al. |
| 7,814,198 | B2 | 10/2010 | Christensen |
| 7,844,942 | B2 | 11/2010 | Eilam |
| 7,890,543 | B2 | 2/2011 | Hunt et al. |
| 7,926,070 | B2 | 4/2011 | Sedukhin |
| 7,974,939 | B2 | 7/2011 | Bhaskar |
| 8,122,106 | B2 | 2/2012 | Hunt et al. |
| 2002/0035593 | A1 | 3/2002 | Salim et al. |
| 2002/0038217 | A1 | 3/2002 | Young |
| 2002/0099818 | A1 | 7/2002 | Russell |
| 2002/0111841 | A1 | 8/2002 | Leymann |
| 2002/0120917 | A1 | 8/2002 | Abrari et al. |
| 2002/0133504 | A1 | 9/2002 | Vlahos et al. |
| 2002/0135611 | A1 | 9/2002 | Deosaran |
| 2002/0147515 | A1 | 10/2002 | Fava et al. |
| 2002/0147962 | A1 | 10/2002 | Hatanaka |
| 2002/0198734 | A1 | 12/2002 | Greene |
| 2003/0005411 | A1 | 1/2003 | Gerken |
| 2003/0061342 | A1 | 3/2003 | Abdelhadi |
| 2003/0084156 | A1 | 5/2003 | Graupner et al. |
| 2003/0135384 | A1 | 7/2003 | Nguyen |
| 2003/0149685 | A1 | 8/2003 | Trossman |
| 2003/0182354 | A1* | 9/2003 | Scheidt et al. ................ 709/106 |
| 2003/0182656 | A1 | 9/2003 | Leathers |
| 2003/0195763 | A1 | 10/2003 | Gulcu |
| 2003/0208743 | A1 | 11/2003 | Chong |
| 2004/0034850 | A1 | 2/2004 | Burkhardt |
| 2004/0040015 | A1 | 2/2004 | Jordan |
| 2004/0046785 | A1 | 3/2004 | Keller |
| 2004/0078461 | A1 | 4/2004 | Bendich et al. |
| 2004/0088350 | A1 | 5/2004 | Early |
| 2004/0102926 | A1 | 5/2004 | Adendorff |
| 2004/0148184 | A1 | 7/2004 | Sadiq |
| 2004/0162901 | A1 | 8/2004 | Mangipudi |
| 2004/0186905 | A1* | 9/2004 | Young et al. .................. 709/225 |
| 2004/0249972 | A1 | 12/2004 | White |
| 2005/0005200 | A1 | 1/2005 | Matena et al. |
| 2005/0010504 | A1 | 1/2005 | Gebhard et al. |
| 2005/0044214 | A1 | 2/2005 | Schwertfuehrer |
| 2005/0055692 | A1 | 3/2005 | Lupini |
| 2005/0071737 | A1 | 3/2005 | Adendorff |
| 2005/0074003 | A1 | 4/2005 | Ball |
| 2005/0091227 | A1 | 4/2005 | McCollum et al. |
| 2005/0120106 | A1 | 6/2005 | Albertao |
| 2005/0125212 | A1 | 6/2005 | Hunt et al. |
| 2005/0132041 | A1 | 6/2005 | Kundu |
| 2005/0137839 | A1 | 6/2005 | Mansurov |
| 2005/0149940 | A1* | 7/2005 | Calinescu et al. ............. 718/104 |
| 2005/0155042 | A1 | 7/2005 | Kolb et al. |
| 2005/0165906 | A1 | 7/2005 | Deo et al. |
| 2005/0182750 | A1 | 8/2005 | Krishna et al. |
| 2005/0188075 | A1 | 8/2005 | Dias |
| 2005/0216831 | A1 | 9/2005 | Guzik |
| 2005/0228855 | A1* | 10/2005 | Kawato ........................ 709/200 |
| 2005/0246656 | A1 | 11/2005 | Vasilev |
| 2005/0251546 | A1 | 11/2005 | Pichetti et al. |
| 2005/0261875 | A1 | 11/2005 | Shrivastava |
| 2005/0268307 | A1 | 12/2005 | Gates et al. |
| 2005/0278702 | A1 | 12/2005 | Koyfman |
| 2005/0283518 | A1 | 12/2005 | Sargent |
| 2006/0010142 | A1 | 1/2006 | Kim |
| 2006/0010164 | A1 | 1/2006 | Netz |
| 2006/0013252 | A1 | 1/2006 | Smith |
| 2006/0036743 | A1 | 2/2006 | Deng |
| 2006/0064460 | A1 | 3/2006 | Sugawara |
| 2006/0070066 | A1 | 3/2006 | Grobman |
| 2006/0070086 | A1 | 3/2006 | Wang |
| 2006/0074730 | A1 | 4/2006 | Shukla et al. |
| 2006/0074734 | A1 | 4/2006 | Shukla |
| 2006/0080352 | A1* | 4/2006 | Boubez et al. ................ 707/102 |
| 2006/0095443 | A1 | 5/2006 | Kumar |
| 2006/0101059 | A1* | 5/2006 | Mizote et al. ................. 707/102 |
| 2006/0123389 | A1 | 6/2006 | Kolawa et al. |
| 2006/0123412 | A1 | 6/2006 | Hunt |
| 2006/0155738 | A1 | 7/2006 | Baldwin |
| 2006/0161862 | A1 | 7/2006 | Racovolis et al. |
| 2006/0173906 | A1 | 8/2006 | Chu et al. |
| 2006/0206890 | A1 | 9/2006 | Shenfield et al. |
| 2006/0230314 | A1 | 10/2006 | Sanjar |
| 2006/0235859 | A1 | 10/2006 | Hardwick |
| 2006/0236254 | A1 | 10/2006 | Mateescu |
| 2006/0242195 | A1 | 10/2006 | Bove |
| 2006/0265231 | A1 | 11/2006 | Fusaro et al. |
| 2006/0277323 | A1 | 12/2006 | Joublin |

| | | | |
|---|---|---|---|
| 2006/0277437 A1 | 12/2006 | Ohtsuka | |
| 2006/0294502 A1 | 12/2006 | Das | |
| 2006/0294506 A1 | 12/2006 | Dengler | |
| 2007/0005283 A1 | 1/2007 | Blouin | |
| 2007/0005299 A1 | 1/2007 | Haggerty | |
| 2007/0006122 A1 | 1/2007 | Bailey et al. | |
| 2007/0016615 A1 | 1/2007 | Mohan et al. | |
| 2007/0033088 A1 | 2/2007 | Aigner et al. | |
| 2007/0038994 A1 | 2/2007 | Davis et al. | |
| 2007/0050237 A1 | 3/2007 | Tien | |
| 2007/0050483 A1 | 3/2007 | Bauer et al. | |
| 2007/0061775 A1 | 3/2007 | Tanaka | |
| 2007/0061776 A1 | 3/2007 | Ryan et al. | |
| 2007/0067266 A1 | 3/2007 | Lomet | |
| 2007/0088724 A1 | 4/2007 | Demiroski | |
| 2007/0089117 A1 | 4/2007 | Samson | |
| 2007/0094350 A1 | 4/2007 | Moore | |
| 2007/0112847 A1 | 5/2007 | Dublish | |
| 2007/0168924 A1 | 7/2007 | Kirby | |
| 2007/0174228 A1 | 7/2007 | Folting | |
| 2007/0174815 A1 | 7/2007 | Chrysanthakopoulos et al. | |
| 2007/0179823 A1 | 8/2007 | Bhaskaran | |
| 2007/0208606 A1 | 9/2007 | Mackay | |
| 2007/0220177 A1 | 9/2007 | Kothari | |
| 2007/0226681 A1 | 9/2007 | Thorup | |
| 2007/0233879 A1 | 10/2007 | Woods | |
| 2007/0244904 A1 | 10/2007 | Durski | |
| 2007/0245004 A1 | 10/2007 | Chess | |
| 2007/0277109 A1 | 11/2007 | Chen | |
| 2007/0283344 A1 | 12/2007 | Apte et al. | |
| 2007/0288885 A1 | 12/2007 | Brunel et al. | |
| 2007/0294364 A1 | 12/2007 | Mohindra et al. | |
| 2008/0005729 A1 | 1/2008 | Harvey | |
| 2008/0010631 A1* | 1/2008 | Harvey et al. | 717/131 |
| 2008/0127052 A1 | 5/2008 | Rostoker | |
| 2008/0209414 A1 | 8/2008 | Stein | |
| 2008/0244423 A1 | 10/2008 | Jensen-Pistorius | |
| 2008/0270411 A1 | 10/2008 | Sedukhin | |
| 2009/0006062 A1 | 1/2009 | Sedukhin | |
| 2009/0049165 A1 | 2/2009 | Long et al. | |
| 2009/0055838 A1 | 2/2009 | Sedukhin | |
| 2009/0112932 A1 | 4/2009 | Skierkowski | |
| 2009/0113292 A1 | 4/2009 | Voss | |
| 2009/0113379 A1 | 4/2009 | Sedukhin | |
| 2009/0113407 A1 | 4/2009 | Sedukhin | |
| 2009/0113437 A1 | 4/2009 | Sedukhin | |
| 2009/0187662 A1 | 7/2009 | Manapragada et al. | |
| 2009/0197662 A1 | 8/2009 | Wright et al. | |
| 2009/0265458 A1 | 10/2009 | Baker | |
| 2010/0005527 A1 | 1/2010 | Jeon | |
| 2011/0179151 A1 | 7/2011 | Sedukhin | |
| 2012/0042305 A1 | 2/2012 | Sedukhin | |

FOREIGN PATENT DOCUMENTS

| | | |
|---|---|---|
| EP | 1770510 | 4/2007 |
| WO | WO 00/38091 | 6/2000 |
| WO | WO 01/24003 | 4/2001 |
| WO | WO0227426 A2 | 4/2002 |
| WO | WO 2007072501 | 6/2007 |

OTHER PUBLICATIONS

D. Raymar et al.; End-to-End Model Driven Policy Based Network Management; 2006-computer.org; pp. 1-4.
R.M. Argent et al.; Development of Multi-Framework Model Components; 2004; Citeseer; pp. 1-6.
U.S. Appl. No. 13/077,730, filed Jul. 14, 2011, Office Action.
U.S. Appl. No. 11/925,680, filed Jul. 18, 2011, Office Action.
U.S. Appl. No. 11/925,591, filed Jul. 5, 2011, Office Action.
U.S. Appl. No. 11/925,201, filed Jul. 19, 2011, Notice of Allowance.
Wikipedia, "Declarative Programming", available at wikipedia.org/w/index.php? title=Declarative_Programming&oldid=1645216, Last accessed Jul. 28, 2011, (3 pages).
Notice of Allowance dated Sep. 30, 2011 cited in U.S. Appl. No. 11/925,201.
Notice of Allowance dated Sep. 29, 2011 cited in U.S. Appl. No. 13/077,730.
Office Action dated Oct. 19, 2011 cited in U.S. Appl. No. 11/925,680.
Quentin Limbourg et al: "USIXML: A Language Supporting Multi-path Development of User Interfaces", Engineering Human Computer Interaction and interactive Systems; [Lecture Notes in Computer Science;;LNCS], Springer-Verlag, Berlin/Heidelberg, vol. 3425, Jun. 30, 2005 pp. 200-220, CP019009959 ISBN: 978-3-540-26097-4.
Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.
Wang L J et al: "Abstract Interface Specification Languages for device-independent Interface Design: Classification, Analysis and Challenges", Pervasive Computing and Applications, 2006 1st International Symposium on, IEEE, PI, Aug. 1, 2006, pp. 241-246.
Jean Vanderdonckt ed—Oscar Pastor et al, "A MDA-Compliant Environment for Developing User Interfaces of information Systems", Advanced Information Systems Engineering; [Lecture Notes in Computer Science;;LNCS], Springer-Verlag, Berling, Berlin/Heidelberg, vol. 3520, May 17, 2005, pp. 16-31.
XiaofengYu et al., "Towards a Model Driven Approach to Automatic BPEL Generation", Model Driven Architecture Foundations and Applications; [Lecture Notes in Computer Science;;LNCS], Springer Berlin Heidelberg, vol. 4530, Jun. 11, 2007 pp. 204-218.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pags. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pags. Retrieved from the Internet: http://www.cs.utep.edu/paulo/papes/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, Inria, France, [online] [retrieved on Apr. 20, 2007], 15 pages Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platfom", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.

Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar El, et al., "Model Driven Provisionings: Bridging the Gap Between Declarative Object Models and Procedural Provisioning Tools", http://wcl.cs.rpi.edu/papers/middleware06.pdf.
OSLO>Suite 2006, "OSLO Suite is the leading platform for designing, building and executing adaptive business solutions", http://www.oslo-software.com/en/product.php.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
Nastel Technologies, Inc., "AutoPilot Business Dashboard Configuration and User's Guide Version 4.4", 2006, AP/DSB 440.001, 82 pages.
TIBCO The Power of Now, "TIBCO BusinessFactor", 2006, 2 pages.
TIBCO, http://www.tibco.com/software/business_activity_monitoring/businessfactor/default.jsp, Copyright 2000-2007, 2 pages.
"Factal:Edge Enlists CMLgroup to Bring Visualization to Business Performance Management Clients", http://extranet.fractaledge.com/News/PressReleases/2006/060829, 2006, 2 pages.
Shaojie Wang, Synthesizing Operating System Based Device Drivers in Embedded Systems, 2003.
U.S. Appl. No. 11/740,737, filed Sep. 14, 2009, Office Action.
U.S. Appl. No. 11/771,827, filed Oct. 14, 2009, Office Action.
U.S. Appl. No. 11/771,816, filed Oct. 1, 2009, Office Action.
U.S. Appl. No. 11/771,816, filed Mar. 2, 2010, Office Action.
U.S. Appl. No. 11/740,737, filed Mar. 18, 2010, Office Action.
U.S. Appl. No. 11/771,827, filed Apr. 5, 2010, Office Action.
U.S. Appl. No. 11/925,326, filed Apr. 13, 2010, Office Action.
U.S. Appl. No. 11/925,326, filed Jul. 22, 2010, Notice of Allowance.
U.S. Appl. No. 11/925,079, filed Sep. 1, 2010, Office Action.
U.S. Appl. No. 11/740,737, filed Sep. 13, 2010, Office Action.
U.S. Appl. No. 11/771,827, filed Nov. 29, 2010, Notice of Allowance.
U.S. Appl. No. 11/925,067, filed Dec. 6, 2010, Notice of Allowance.
U.S. Appl. No. 11/925,184, filed Jan. 14, 2011, Office Action.
U.S. Appl. No. 11/740,737, filed Feb. 10, 2011, Office Action.
U.S. Appl. No. 11/925,079, filed Mar. 1, 2011, Notice of Allowance.
U.S. Appl. No. 11/925,184, filed Apr. 25, 2011, Office Action.
U.S. Appl. No. 11/740,737, filed Apr. 29, 2011, Notice of Allowance.
Rowe, L.A., et al., "Automating the Selection of Implementation Structures," IEEE Transactions on Software Engineering, Nov. 1978, pp. 494-506, [retrieved on Jan. 6, 2012], Retrieved from the Internet: <URL:http://ieeexplore.ieee.org/>.
Oberle, D., et al., "Developing and Managing Software Components in an Ontology-Based Application Server," Proceedings of the 5th ACM/IFIP/USENIX international conference on Middleware, Oct. 2004, pp. 459-477, [retrieved on Jan. 6, 2012], Retrieved from the Internet: <URL:http://dl.acm.org/>.
Notice of Allowance dated Jan. 17, 2012 cited in U.S. Appl. No. 11/925,591.
Notice of Allowance dated Mar. 9, 2012 cited in U.S. Appl. No. 11/844,177.
Ketfi A., et al., "Model-Driven framework for Dynamic Deployment and Reconfiguration of Component-Based Software Systems", Metainformatics Symposium, Nov. 9-11, 2005, 9 pages, [retrived on Mar. 6, 2012], retrived from the Internet: <URL:http://dl.amc.org/>.
Eastman, J., et al., "Service Lifecycle in a Distributed Computing Environment", IEEE, 1998, pp. 183-184, [retrieved on Mar. 6, 2012], Retrieved from the Internet: <URL:http://ieeexplore.ieee.org/>.
Notice of Allowance dated Mar. 14, 2012 cited in U.S. Appl. No. 11/925,680.
U.S. Appl. No. 11/844,177, filed Mar. 28, 2012, Notice of Allowance.
U.S. Appl. No. 11/771,816, filed Apr. 10, 2012, Notice of Allowance.

* cited by examiner

PROCESSING MODEL-BASED COMMANDS FOR DISTRIBUTED APPLICATIONS

CROSS-REFERENCE TO RELATED APPLICATIONS

This application is a continuation of U.S. patent application Ser. No. 11/925,079, entitled "PROCESSING MODEL-BASED COMMANDS FOR DISTRIBUTED APPLICATIONS," which was filed on Oct. 26, 2007 and which issued on Jul. 5, 2011 as U.S. Pat. No. 7,974,939, and which is hereby expressly incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. Further, distributed applications can be multi-tiered and have many (differently configured) distributed components and subsystems, some of which are long-running workflows and legacy or external systems (e.g., SAP). One can appreciate, that while this ability to combine processing power through several different computer systems can be an advantage, there are various complexities associated with distributing application program modules.

For example, the very distributed nature of business applications and variety of their implementations creates a challenge to consistently and efficiently manage their lifecycle. The challenge is due at least in part to diversity of implementation technologies composed into a distributed application program. That is, diverse parts of a distributed application program have to behave coherently and reliably. Typically, different parts of a distributed application program are individually and manually made to work together. For example, a user or system administrator creates text documents describing commands that indicate, for example, how and when to verify, clean, check, fix, deploy, start, stop, undeploy, etc., parts of an application and what to do when failures occur. Accordingly, it is then commonly a manual task to act upon the commands described in these text documents.

BRIEF SUMMARY

The present invention extends to methods, systems, and computer program products for processing model-based commands for distributed applications. A command request for a distributed application is received. The command request includes a command reference to a command definition model defining a corresponding command and includes a reference to model. The command request indicates that the corresponding command is to be implemented for the reference.

A command record for the received command request is created in a repository. The command record stores information related to implementing the command request. A workflow model is identified from the command definition model. The workflow model describes how to implement the received command request.

The workflow model is accessed from the repository and an instance of the workflow is created from the workflow model. The workflow instance has a command ID and includes a set of pre-defined activities configured to interoperate to implement the command request. The command ID is stored in the command record. The application reference is submitted to the workflow instance to initiate the workflow instance. Information related to the behavior of the workflow instance is recorded within the command record as the workflow instance implements the command request for the application model.

In some embodiments, application models are locked during command implementation and then released. For example, an application model is locked to prevent another command from executing the same model while the workflow instance implements the command request for the application model. Subsequently, the workflow instance completes or a request to stop the workflow instance is received prior to the workflow instance completing implementation of the command request. A stop request is issued to the workflow instance. It is determined that the workflow instance is stopped. The lock on the application model is released such that other commands can be implemented for the application model.

In other embodiments, multiple services interoperate to distributed implementation of a command. A first executive service receives a command request for a distributed application. The first executive service determines that it is already running a plurality of other model-based commands. The first executive service queries the repository to discover other executive services. The first executive service receives an indication that a second executive service can be communicated with to load balance processing of model-based commands. The first executive service passes the command request to the second executive service in response to the indication. Accordingly, the load of command processing can be balanced across a plurality of executive services.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
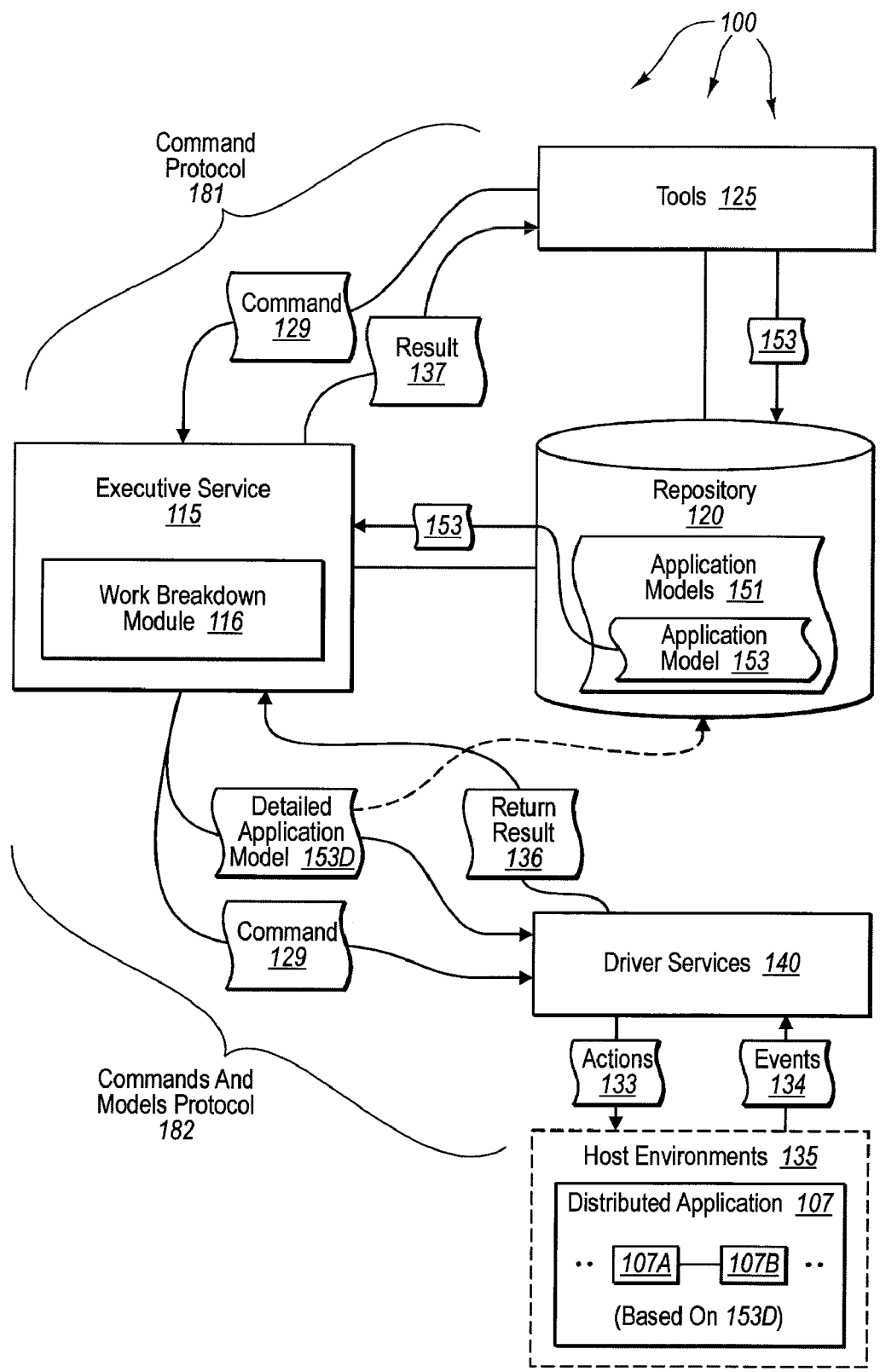
FIGS. 1A and 1B illustrate an example computer architecture that facilitates processing model-based commands for distributed applications.

The present invention extends to methods, systems, and computer program products for processing model-based commands for distributed applications. A command request for a distributed application is received. The command request includes a command reference to a command definition model defining a corresponding command and includes a reference to model. The command request indicates that the corresponding command is to be implemented for the reference.

A command record for the received command request is created in a repository. The command record stores information related to implementing the command request. A workflow model is identified from the command definition model. The workflow model describes how to implement the received command request.

The workflow model is accessed from the repository and an instance of the workflow is created from the workflow model. The workflow instance has a command ID and includes a set of pre-defined activities configured to interoperate to implement the command request. The command ID is stored in the command record. The application reference is submitted to the workflow instance to initiate the workflow instance. Information related to the behavior of the workflow instance is recorded within the command record as the workflow instance implements the command request for the application model.

In some embodiments, application models are locked during command implementation and then released. For example, an application model is locked to prevent another command from executing the same model while the workflow instance implements the command request for the application model. Subsequently, the workflow instance completes or a request to stop the workflow instance is received prior to the workflow instance completing implementation of the command request. A stop request is issued to the workflow instance. It is determined that the workflow instance is stopped. The lock on the application model is released such that other commands can be implemented for the application model.

In other embodiments, multiple services interoperate to distributed implementation of a command. A first executive service receives a command request for a distributed application. The first executive service determines that it is already running a plurality of other model-based commands. The first executive service queries the repository to discover other executive services. The first executive service receives an indication that a second executive service can be communicated with to load balance processing of model-based commands. The first executive service passes the command request to the second executive service in response to the indication. Accordingly, the load of command processing can be balanced across a plurality of executive services.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1B:
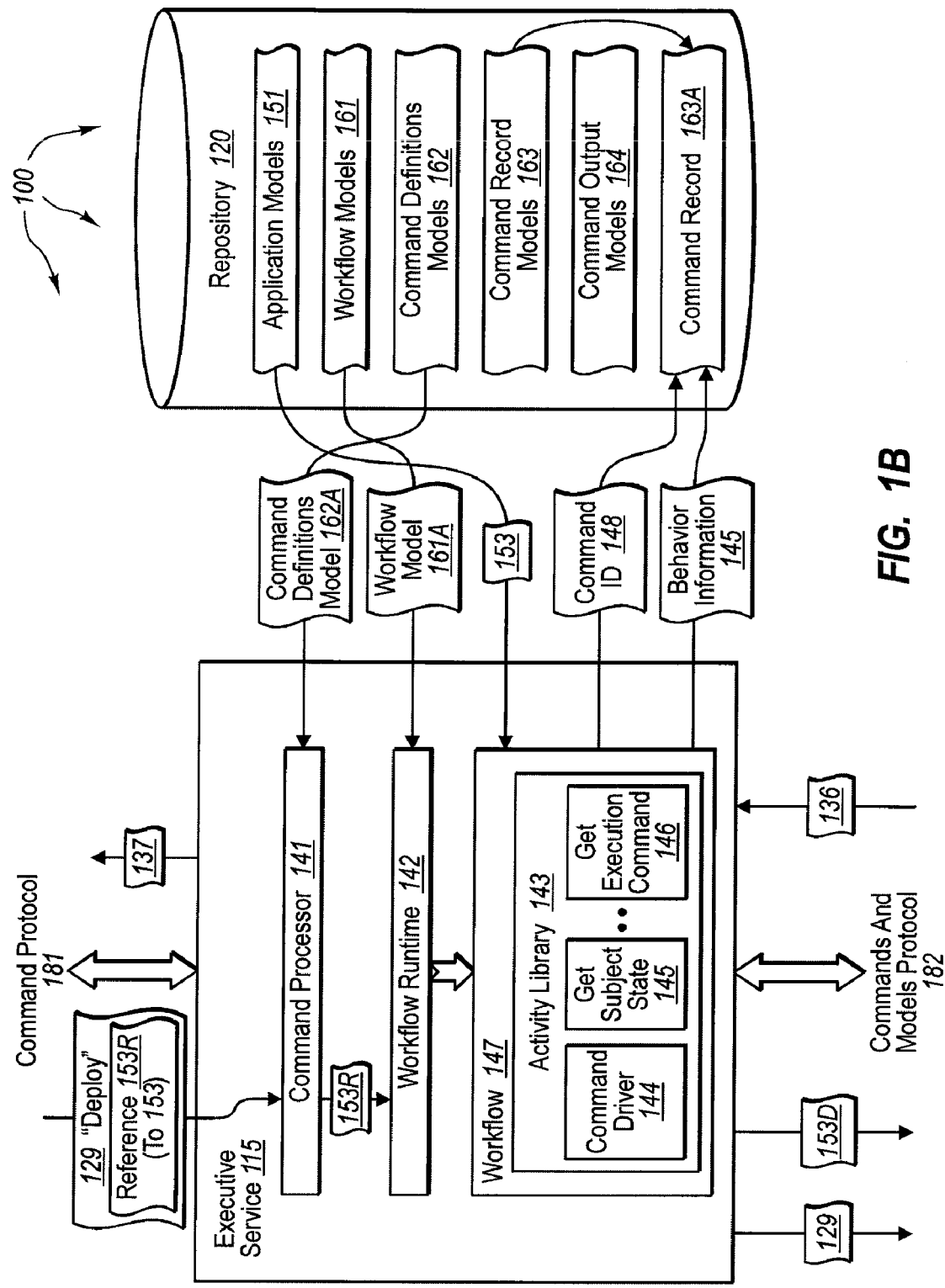

FIGS. 1A and 1B illustrates an example computer architecture 100 that facilitates processing model-based commands for distributed applications. Referring initially to FIG. 1A, tools 125, repository 120, executive service 115, driver services 140, and host environments 135 are depicted in computer architecture 100. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 125 can be used to write, modify, and store application models 151, such as, for example, declarative application model 153, in repository 120. Declarative models are used to describe the structure and behavior of real-world applications. Thus, a user (e.g., distributed application program developer) can use one or more of tools 125 to create declarative application model 153.

Generally, declarative models include one or more sets of high-level instructions expressing application intent for a distributed application. Thus, the high-level instructions generally describe operations and/or behaviors of one or more modules in the distributed application program. However, the high-level instructions do not necessarily describe implementation steps required to deploy a distributed application having the particular operations/behaviors (although they can if appropriate). For example, declarative application model 153 can express the generalized intent of a workflow, including, for example, that a first Web service be connected to a database. However, declarative application model 153 does not necessarily describe how (e.g., protocol), when, where (e.g., URI endpoint), etc., the Web service and database are to be connected to one another.

Generally, to implement a command for an application based on a declarative model, the command and a reference to the declarative model can be sent to executive service 115. Executive service 115 can refine the declarative model until there are no ambiguities and the details are sufficient for drivers (e.g., included in driver services 140) to consume. Thus, executive service 115 can receive and refine declarative application model 153 so that declarative application model 153 can be translated by drivers (e.g., one or more technology-specific drivers) included in driver services 140.

Tools 125 and executive service 115 can exchange commands for model-based applications and corresponding results using command protocol 181. For example, tools 125 can send command 129 to executive services 115 to perform a command for a model based application. Executive service 115 can report result 137 back to tools 125 to indicate the results and/or progress of command 129. Generally, a command represents an operation to be performed on a model. Operations include creating, verifying, re-verifying, cleaning, deploying, undeploying, checking, fixing, updating, monitoring, starting and stopping distributed applications based on corresponding declarative models.

In general, "refining" a declarative model can include some type of work breakdown structure, such as, for example, progressive elaboration, so that the declarative model instructions are sufficiently complete for translation by driver services 140. Since declarative models can be written relatively loosely by a human user (i.e., containing generalized intent instructions or requests), there may be different degrees or extents to which executive service 115 modifies or supplements a declarative model for implementing a command for an application. Work breakdown module 116 can implement a work breakdown structure algorithm, such as, for example, a progressive elaboration algorithm, to determine when an appropriate granularity has been reached and instructions are sufficient for drivers.

Executive service 115 can also account for dependencies and constraints included in a declarative model. For example, executive service 115 can be configured to refine declarative application model 153 based on semantics of dependencies between elements in the declarative application model 153 (e.g., one web service connected to another). Thus, executive service 115 and work breakdown module 116 can interoperate to output detailed application model 153D that provides driver services 140 with sufficient information to realize distributed application 107.

In additional or alternative implementations, executive service 115 can also be configured to refine the declarative application model 153 for some other contextual awareness. For example, executive service 115 can refine information about the inventory of host environments 135 that may be available in the datacenter where a distributed application 107 is to be deployed. Executive service 115 can reflect contextual awareness information in detailed application model 153D.

In addition, executive service 115 can be configured to fill in missing data regarding computer system assignments. For example, executive service 115 can identify a number of different distributed application program modules in declarative application model 153 that have no requirement for specific computer system addresses or operating requirements. Thus, executive service 115 can assign distributed application program modules to an available host environment on a computer system. Executive service 115 can reason about the best way to fill in data in a refined declarative application model 153. For example, as previously described, executive service 115 may determine and decide which transport to use for an endpoint based on proximity of connection, or determine and decide how to allocate distributed application program modules based on factors appropriate for handling expected spikes in demand. Executive service 115 can then record missing data in detailed declarative model 153D (or segment thereof).

In addition or alternative implementations, executive service 115 can be configured to compute dependent data in the declarative application model 153. For example, executive service 115 can compute dependent data based on an assignment of distributed application program modules to application containers on computer systems. Thus, executive service 115 can calculate URI addresses on the endpoints, and propagate the corresponding URI addresses from provider endpoints to consumer endpoints. In addition, executive service 115 may evaluate constraints in the declarative model 153. For example, the executive service 115 can be configured to check to see if two distributed application program modules can actually be assigned to the same machine, and if not, executive service 115 can refine detailed application model 153D to accommodate this requirement.

Accordingly, after adding appropriate data (or otherwise modifying/refining) to declarative application model 153 (to create detailed application model 153D), executive service 115 can finalize the refined detailed application model 153D so that it can be translated by technology-specific drivers in drivers services 140. To finalize or complete the detailed application model 153D, executive service 115 can, for example, partition a declarative application model into segments (e.g., application modules) so that target drivers can request for detailed info about individual segments. Thus, executive service 115 can tag each declarative application model (or segment thereof) with its target driver (e.g., the address of a technology-specific driver).

Furthermore, executive service 115 can verify that a detailed application model (e.g., 153D) can actually be translated by one or more technology-specific drivers, and, if so, pass the detailed application model (or segment thereof) to a particular technology-specific driver for translation. For example, executive service 115 can be configured to tag portions of detailed application model 153D with labels indicating an intended implementation for portions of detailed application model 153D. An intended implementation can indicate a framework and/or a host, such as, for example, WCF-IIS, Aspx-IIS, SQL, Axis-Tomcat, WF/WCF-WAS, etc.

After refining a model, executive service 115 can store the refined model back in repository 120 for later use. Thus, executive service 115 can forward detailed application model 153D to driver services 140 or store detailed application model 153D in repository 120. When detailed application model 153D is stored in repository 120, it can be subsequently provided to driver services 140 without further refinements.

Executive service 115 and driver services 140 can perform requested commands for model-based applications using commands and models protocol 182. For example, executive service 115 can send detailed application model 153D and command 129 to driver services 140. Driver services 140 can report return result 136 back to executive service 115 to indicate the results and/or progress of command 129.

Upon receiving detailed application model 153D and command 129, driver services 140 can take actions (e.g., actions 133) to implement an operation for a distributed application (e.g., distributed application 107, including application parts 107A and 107B) based on detailed application model 153D. Driver services 140 interoperate with one or more (e.g., technology-specific) drivers and translators to translate detailed application module 153D (or declarative application model 153) into one or more (e.g., technology-specific) actions 133. Actions 133 can be used to realize command 129 for a model-based application.

Thus, distributed application 107 can be implemented in host environments 135. Each application part, for example, 107A, 107B, etc., can be implemented in a separate host environment and connected to other application parts via corresponding endpoints.

Accordingly, the generalized intent of declarative application model 135, as refined by executive service 115 and implemented by drivers accessible to driver services 140, is expressed in one or more of host environments 135. For example, when the general intent of declarative application model 153 is to connect two Web services, specifics of connecting the first and second Web services can vary depending on the platform and/or operating environment. For example, when deployed within the same data center Web service endpoints can be configured to connect using TCP. On the other hand, when the first and second Web services are on opposite sides of a firewall, the Web service endpoints can be configured to connect using a relay connection.

Distributed application programs can provide operational information about execution. For example, during execution distributed application can emit events 134 indicative of events (e.g. execution or performance issues) that have occurred at a distributed application. In one implementation, driver services 140 collects emitted events and sends out an event stream to a monitoring service on a continuous, ongoing basis, while, in other implementations, an event stream is sent out on a scheduled basis (e.g., based on a schedule setup by a corresponding technology-specific driver). The monitoring service can perform analysis, tuning, and/or other appropriate model modifications.

FIG. 1B depicts an example expanded view of executive service 115 and repository 120. Executive service 115 includes command processor 141 and workflow runtime 142. Command processor 141 and workflow runtime 142 are configured to interoperate to create workflows (e.g., workflow 142) for processing received commands.

Generally, workflows are composed of a set of activities, such as, for example, provided by a command processor activity library or the Windows® Workflow Foundation Service ("WF"). A command processor library consists of a set of well-defined activities. Use of a library facilities simple and efficient workflow authoring constrained to safe execution by an executive service. Activities can be categorized into at least two groups: command-specific and model-specific. Command specific activities include driver activities that interacts with driver services 140 to issue driver commands, such as, for example, Verify and Deploy. Model-specific activities include state-related activities such as, for example, SetState, GetState and execution-related activities such as, for example, GenerateExecutionPlan, and etc. State-related activities relate to retrieval and update of a subject state in the Repository. GenerateExecutionPlan analyzes dependencies declared in a model and creates an action plan for model parts to be executed in an orderly manner.

In same environments, various default workflows, such as, for example, Verify, Deploy, Start/Stop, Fix, can be provided.

A particular workflow is identified as implementation of a certain command. The relationship between command and workflow can be 1:1, by default. However, it is also possible to have one to many associations, and executive service 115 is extensible for allowing such functionality.

In addition to application models, repository 120 is further configured to store other types of models, such as, for example, workflow models (e.g., 161), command definition models (e.g., 162), command record models (e.g., 163), and command output models (e.g., 164).

Generally, command processor 141 is configured to receive commands (e.g., 129) that request to operate on models in the repository. Commands can be defined through workflows put together using a pre-defined activity library. In some embodiments, received commands are software lifecycle commands. Accordingly, commands can be mapped to individual workflows to drive model-based applications through there respective lifecycles (e.g., valid, ready, deployed, running, etc.).

Thus, when a command is issued to command processor 141 on a subject model, command processor 141 facilitates execution of a workflow that corresponds to the command. The workflow could be short lived or a long running process, which may sometimes take days or longer to complete. While this command is being executed, command processor 141 can lock the subject model so that the same command or any other command cannot be issued against the subject.

Command processor 141 also includes a built-in command logging mechanism. Each log entry associated with a command can be captured in a command output stored in repository 120. A complete command log is the history of all the operations that have been performed by the command. Possible records can included: the selected workflow, start time for the workflow, entrance and exit of workflow activities, messages received from drivers services 140 regarding logging, progress, results, and etc., user specific data, detailed error cases including references to models that cause errors.

Accordingly, since repository 120 maintains command output (e.g., in log entries) for models, queries against command output provide rich set of information about applications and commands. Queries can be issued against current as well as past command executions. Thus, Tools 125 (or a user) can access the maintained command output to reason about problems with models and to act upon them accordingly. For example, command status can be fetched to understand progress of a command.

In addition, complex queries can be created to have in-depth understanding of commands and their command output, based on various input criteria. For example, queries "by command", "by requestor", "by model", "by time", etc., as well as combinations thereof can be issued. These and other types of queries against command execution information provide enhanced visibility into operations within the system.

Figure 2:
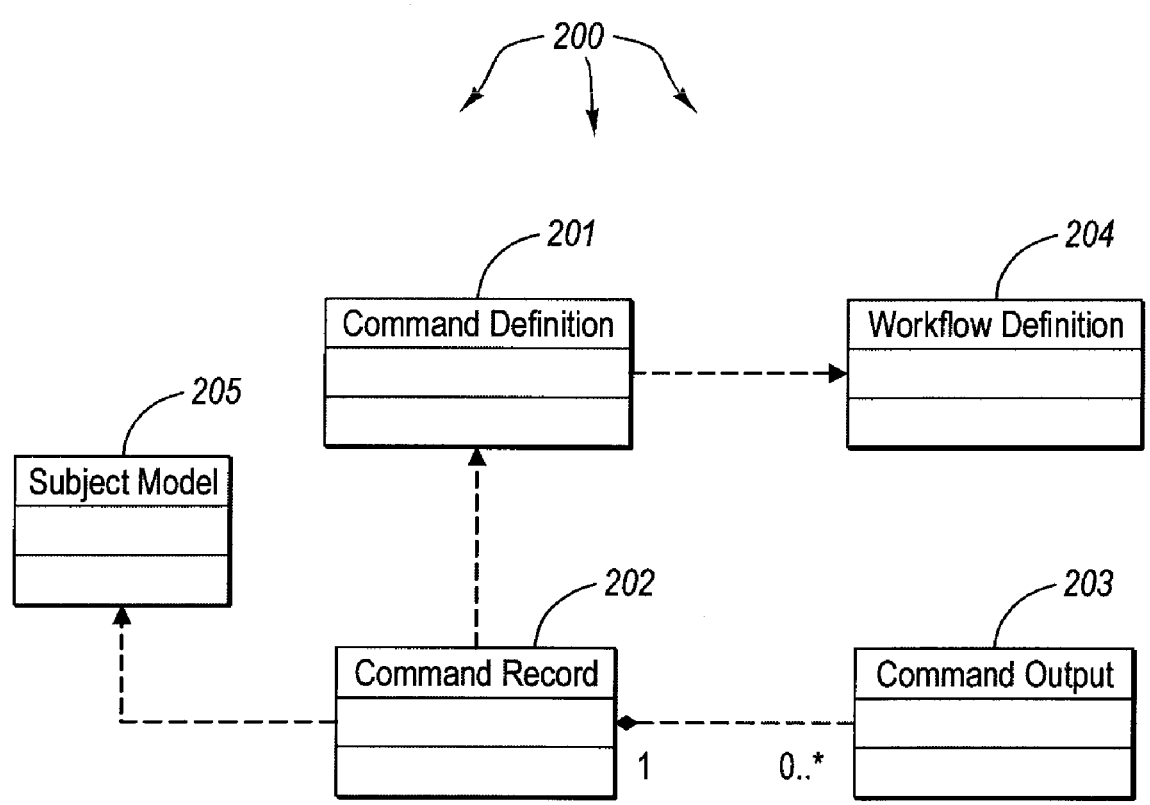
FIG. 2 illustrates example relationships between various models that can interoperate to process model-based commands.

FIG. 2 illustrates example relationships 200 between various models that can interoperate to process model-based commands. Generally, an instance of command record 205 maintains specific information about a command request. Instances of command record 205 can include a unique identifier representing a command ID, a reference to an instance of command definition 201, a data and time when the command is created and modified, a command status, a reference to an instance of a subject model 205 (e.g., an application model) upon which the command is to run, an workflow ID identifying the workflow instance executing the command, and a set of parameters for the workflow.

Instances of command output record 203 can be associated with command record 205 to keep track of logging information for the command. Instances of command output record 203 can include a data and time of creation, an output type, a message, and an output source.

As previously described, an instance of command record 202 can reference an instance of command definition 201. An instance of command definition 201 can include a command name, an instance of workflow definition 204, and a set of name-value pairs of parameters a workflow is to accept.

An instance of workflow definition 204 is a descriptive (e.g., XML or XAML) representation of a workflow.

Accordingly, when command processor 141 receives a command request, it identifies a corresponding command definition in repository 120. From the command definition, command processor 141 further determines the appropriate workflow model that is to be used to implement the command request. Received commands also includes a reference to a subject (e.g., application) model to be acted upon. Thus, after a workflow is identified, the model reference is passed to the workflow Command parameters from a command request can be validated against the parameters expected by the workflow (e.g., in command definition model 162A). If the parameters are validity check goes through, command processor 141 creates a command record (e.g., command record models 163A). Command processor then starts execution of a workflow (e.g., based on a workflow model 161A) in its runtime environment (e.g., workflow runtime 142). A workflow instance (e.g., workflow 147) is thus created and associated with the command record. Depending on the progress of workflow execution, the command record is updated accordingly to reflect the running status. Upon the completion or termination of the workflow, the command status is updated with success or failure.

Figure 3:
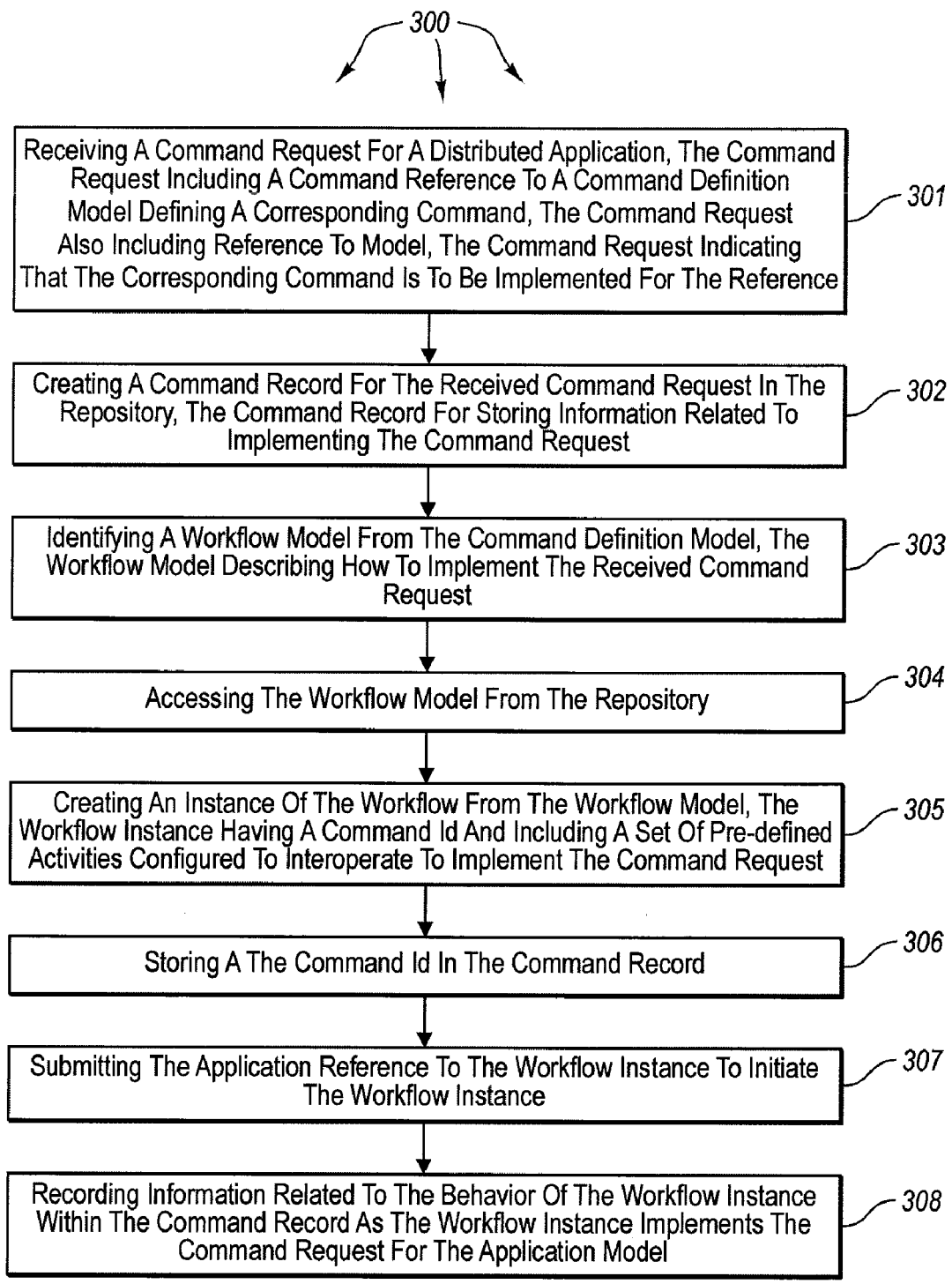
FIG. 3 illustrates a flow chart of an example method for processing a model-based command.

FIG. 3 illustrates a flow chart of an example method for processing a model-based command. Method 300 will be described with respect to the components and data in computer architecture 100.

Method 300 includes an act of receiving a command request for a distributed application, the command request including a command reference to a command definition model defining a corresponding command, the command request also including a reference to an application model, the command request indicating that the corresponding command is to be implemented for the application model (act 301). For example, command processor 141 can receive command 129. Command 129 includes command reference "deploy", that can be used to refer to a command definition model 162A (a model for implementing a deploy command). Command 129 also includes reference 153R to declarative application model 153. Thus, the command request indicates that a deploy command is to be implemented for declarative application model 153.

Method 300 includes an act of creating a command record for the received command request in the repository, the command record for storing information related to implementing the command request (act 302). For example, command processor 141 can crate command record 163A in repository 120. Command record 163A can store information related to command 129.

Method 300 includes an act of identifying a workflow model from the command definition model, the workflow model describing how to implement the received command request (act 303). For example, command processor 141 can identify workflow model 161A from command definition model 162A. Workflow model 161A describes how to implement command 129 ("deploy") for declarative application model 153. Method 300 includes an act of accessing the workflow model from the repository (act 304). For example, command processor 141 can access workflow model 161A from repository 120.

Method 300 includes an act of creating an instance of the workflow from the workflow model, the workflow instance having a command ID and including a set of pre-defined activities configured to interoperate to implement the command request (act 305). For example, command process 141 can pass workflow model 161A to workflow runtime 142. Workflow runtime 142 can in turn generate workflow 147 based on workflow model 161A. Workflow instance 147 is created with command ID 148 (to distinguish it from other workflow). Activity library 143 includes pre-defined activities, including command driver 144, get subject state 145, and get execution command 146, configured to interoperate to implement command 129 ("deploy") for declarative application model 153. Method 300 includes an act of storing the command ID in the command record (act 306). For example, command process 141 can store command ID 148 in command record 163A.

Method 300 includes an act of submitting the application reference to the workflow instance to initiate the workflow instance (act 307). For example, reference 153R can be submitted to workflow 147 to initiate workflow 147. Workflow 147 can use reference 153R to access model 153 and begin processing model 153. Pre-defined activities (e.g., 144, 145, 146, etc.) in activity library 143 can be applied to model 153 to implements command 129 ("deploy") for declarative application model 153.

Method 300 includes an act of recording information related to the behavior of the workflow instance within the command record as the workflow instance implements the command request for the application model (act 308). For example, during implementation of command 129 ("deploy") for declarative application model 153, workflow 147 can generate behavior information 145 related to the behavior of workflow 147. Behavior information 145 can be stored in command record 163A, as workflow 147 implements command 129 ("deploy").

In some embodiments, application models are locked during command implementation and then released. For example, declarative application model 153 can be locked to prevent another command from executing on application model 153 while the workflow instance 147 implements command 129 for declarative application model 153. Subsequently, workflow 147 completes or a request to stop the workflow 147 is received prior to the workflow 147 completing implementation of command 129. When a request to stop (e.g., a cancel or terminate call) is received, a stop request is issued to workflow 147. It is subsequently determined that workflow 147 instance is stopped (e.g., completed, cancelled, or terminated). In response, the lock on declarative application model 153 is released such that other commands can be implemented for declarative application model 153.

Accordingly, command processor 141 provides rich command execution pattern that is asynchronous. For example, command processor 141 can hand off command 129 to workflow runtime 142 that executes workflow 147 in a separate thread.

In some embodiments, once the workflow execution is started, a token is returned to the caller as the command ID for the 'ExecuteCommand' call. The command ID can be used later to retrieve the command status using the 'GetCommandInfo' method. Depending on the nature of a workflow, the command status may or may not be updated between status retrieval of consecutive calls.

Further, the functionality of workflow 147 can interoperate with work breakdown module 116 to refine a model to a level of detail sufficient for consumption by driver services 140.

Figure 4A:
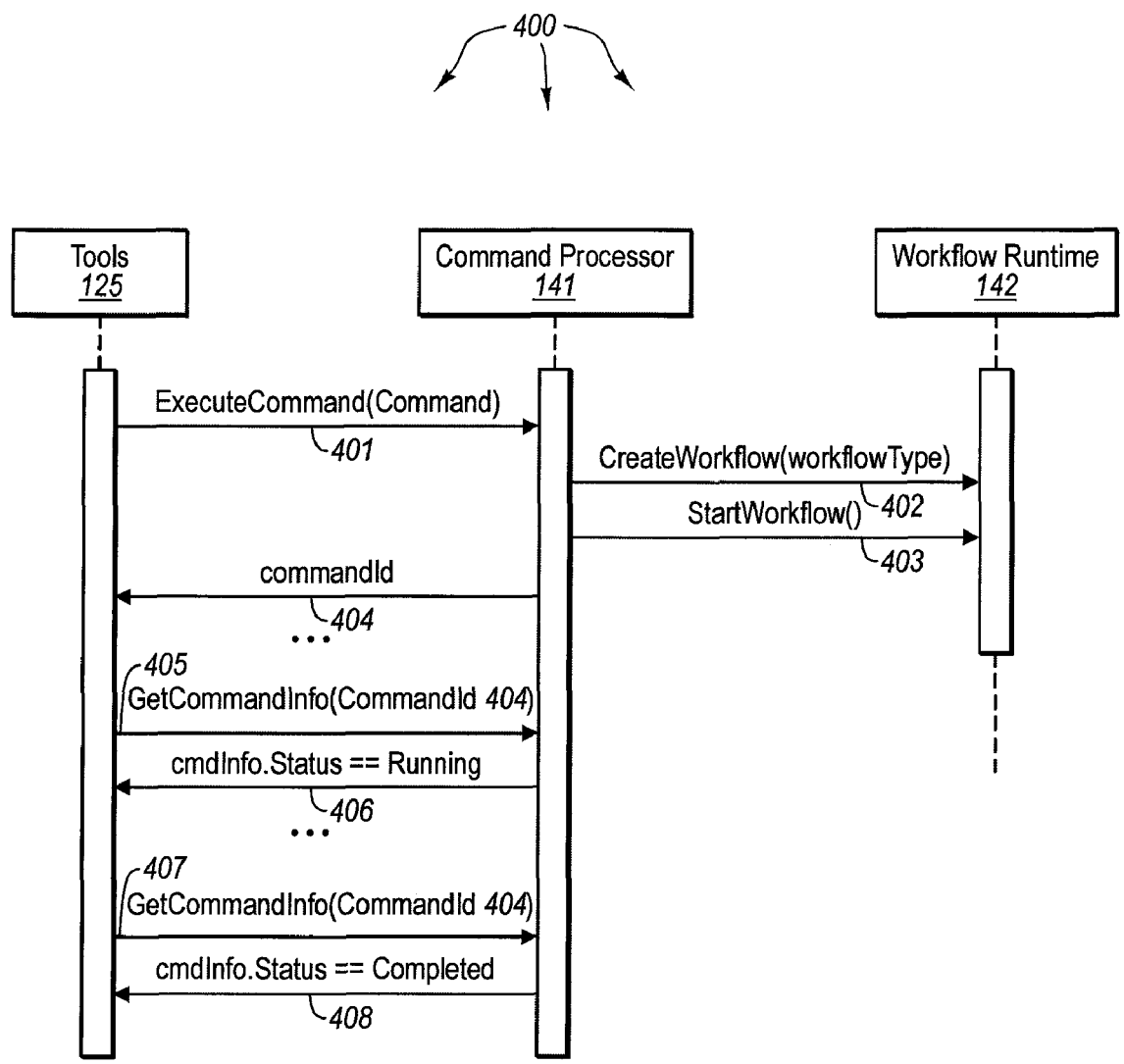
FIG. 4A illustrates an example data flow for a command protocol for processing a model-based command.

FIG. 4A illustrates an example data flow 400 for a command protocol for processing a model-based command. Tools 125 sends ExecuteCommand message 401 to command processor 141. ExecuteCommand message 401 can include a reference to the subject (e.g., application) model and an indication of the command that is to be applied to the subject (e.g., application) model. Command processor 141 can check if another command is in progress against the same subject model. If no other command is to be executed on the subject model, command processor 141 creates a command record for the indicated command. Command processor 141 identifies the appropriate workflow model to implement the indicated command.

Command processor 141 sends CreateWorkflow message 402 to workflow runtime 142. CreateWorkflow message 402 indicates the workflow type (e.g., by reference to a workflow model) to workflow runtime 142. Command processor 141 then sends Start Workflow message 403 to workflow runtime 142. In response to StartWorkflow message 403, workflow runtime 142 starts the workflow and creates command ID 404 for the workflow. After the workflow is started, command processor 141 returns command 404 to tools 125.

During workflow execution, command output entries are created and associated with the command record. Upon completion, termination, cancellation, etc. of the workflow, the status of the command record can be updated. Since, the command record is stored repository 120, the command record can be queried by other services in computer architecture 120.

From time to time, tools 125 can query command processor 141 (e.g., as part of command protocol 181) for the status of the workflow. For example, tools 125 can send GetCommandInfo message 405 including command ID 404 to command processor 141. This indicates to command processor 141 that tools 125 is interested in the status of the command. When the workflow is still running, command processor can return message 406 back to tools 125. Subsequently, tools 125 can send GetCommandInfo message 407 including command ID 404 to command processor 141. If the workflow is now completed, command processor can return message 406 back to tools 125.

Command processor 141 can also handle errors that occur during implementation of a command. For example, when processing long running workflows or in interactions with other components error saturations may occur, such as for example, due to misinformation in a model. In general, commands are idempotent and they can easily be reapplied. In the case of commands serving as transitions in a lifecycle, the result of command failure will leave the lifecycle of a subject model in the current state. In order for the failure to be resolved, command processor 141 maintains detailed error information in the command record and its associated command output entries.

Command processor 141 also includes semantics for cancelling and terminating operations. For example, a command could be long running, or get to an unexpected error situation that keeps the command in the running state for some time. Under these (or other) circumstances, a user may choose to cancel such a command. As the result of cancellation, the command record is set to the 'Cancelled' state if the operation is completed successfully. As a further operation, if a command does not respond to a cancel request, command processor 141 can issue a Terminate call to attempt to force a workflow instance to terminate. The command record is set to the 'Terminated' state once that happens.

Figure 4B:
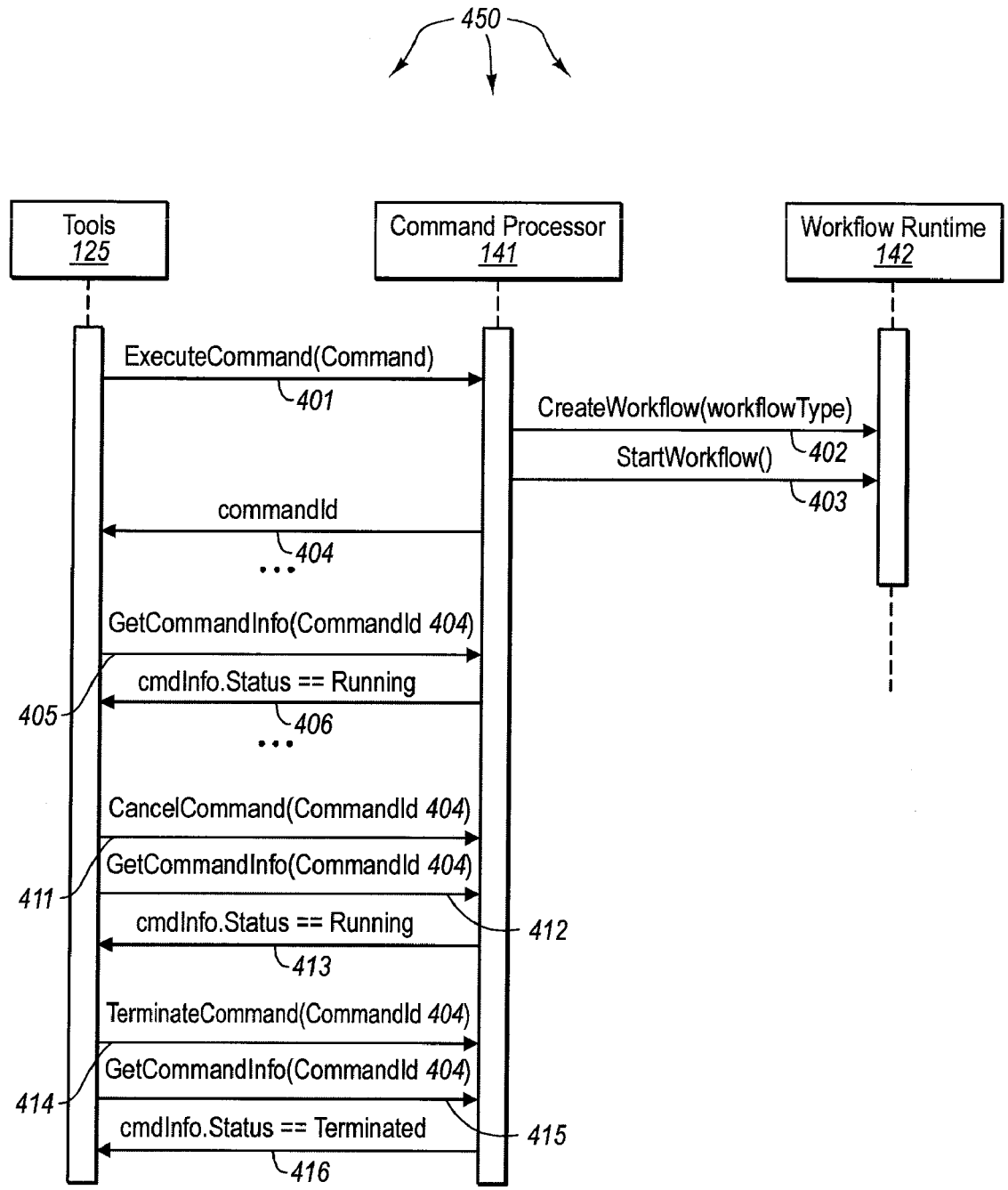
FIG. 4B illustrates an example data flow for a command protocol to stop processing a model-based command.

FIG. 4B illustrates an example data flow 450 for a command protocol to stop processing a model-based command. Within data flow 450, establishment of a workflow, return of a command ID 404, and an initial status check can be performed as described with respect to data flow 400. Generally, cancel and terminate calls can be issued to unlock a model being operated upon to permit another command to be issued.

For example, at some point during execution, tools 125 can issue CancelCommand message 411. CancelCommand message 411 includes command ID 404. In response to receiving CancelCommand message 411, command processor 141 can attempt to Cancel the workflow. Depending on the status of the workflow (e.g., type of error, etc.) cancellation may or may not be successful.

Tools 125 can subsequently query command processor 141 (e.g., as part of command protocol 181) for the status of the workflow. For example, tools 125 can send GetCommandInfo message 412 including command ID 404 to command processor 141. This indicates to command processor 141 that tools 125 is interested in the status of the workflow. When the workflow is still running, command processor can return message 413 back to tools 125. On the other hand when the workflow is cancelled, command processor can return a message indicating a cancelled status back to tools 125.

Message 413 indicates to tools 125 that CancelCommand message 411 was not successful. In response, tools 125 can issue TerminateCommand message 414. TerminateCommand message 414 includes command ID 404. In response to receiving TerminateCommand message 414, command processor 141 can attempt to Terminate the workflow. Tools 125 can subsequently query command processor 141 (e.g., as part of command protocol 181) for the status of the workflow. For example, tools 125 can send GetCommandInfo message 415 including command ID 404 to command processor 141. This indicates to command processor 141 that tools 125 is interested in the status of the workflow. When the workflow is terminated, command processor can return message 416 back to tools 125.

A terminate call can be a more intrusive call that forces a workflow to stop, when less intrusive calls, for example, cancel, are not working. However, when Cancel (or other mechanisms) fail, a terminate call can force a workflow stoppage as a last resort.

Figure 5:
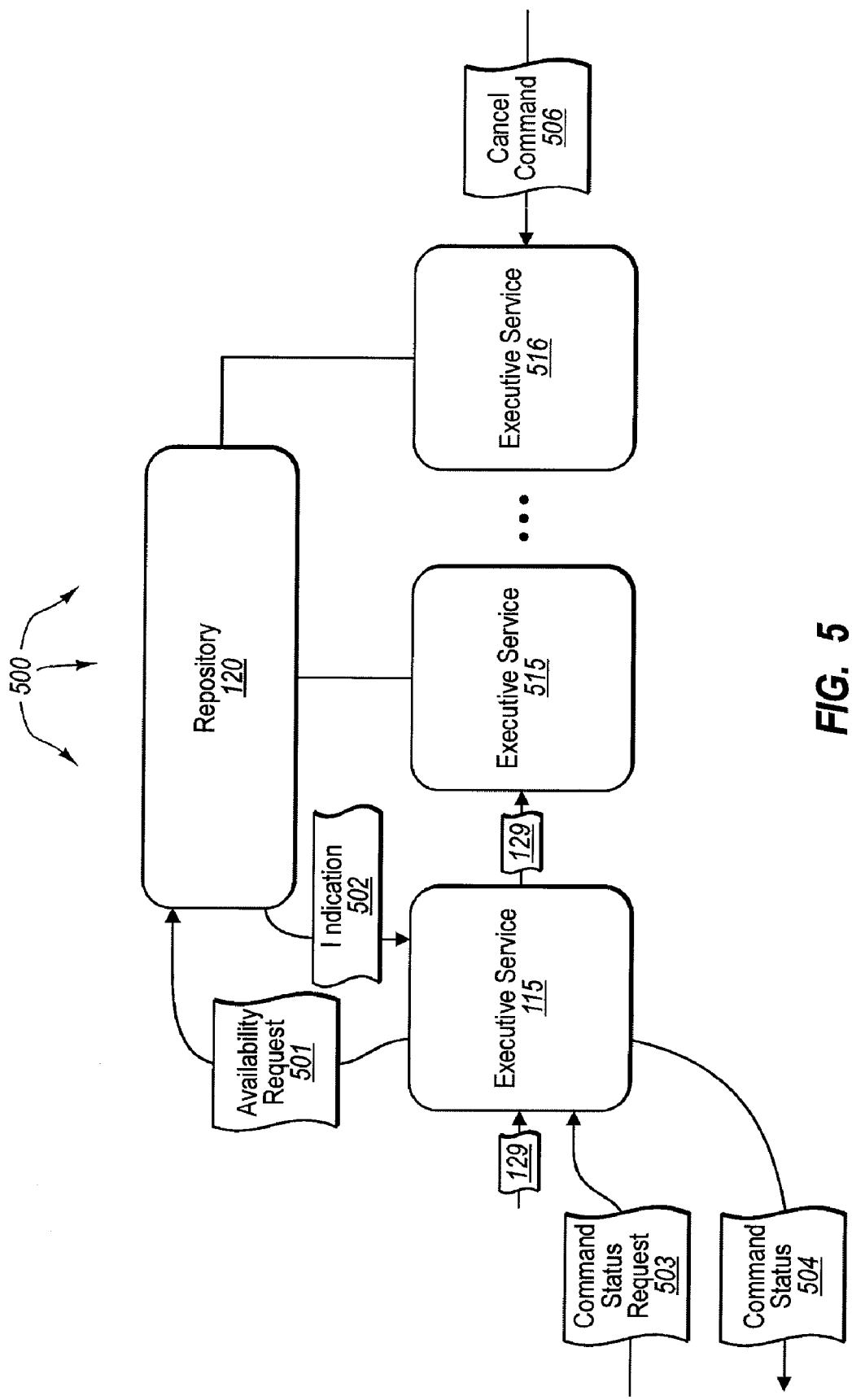
FIG. 5 illustrates an example computer architecture that facilitates distributing the implementation of a model-based command.

In some embodiments, multiple executive services interoperate to process commands for model-based applications. FIG. 5 illustrates an example computer architecture 500 that facilitates distributing the implementation of a model-based command. As depicted, a plurality of executive services including, executing services 115, 515, and 516 share repository 120. Thus, any model stored in repository 120 is available to any of the plurality of executive services. Within architecture 500, repository 120 can also store state and availability information for each executive service. Accordingly, executive services can query repository 120 to become aware of other executive services and determine the state and availability of other executive services.

Figure 6:
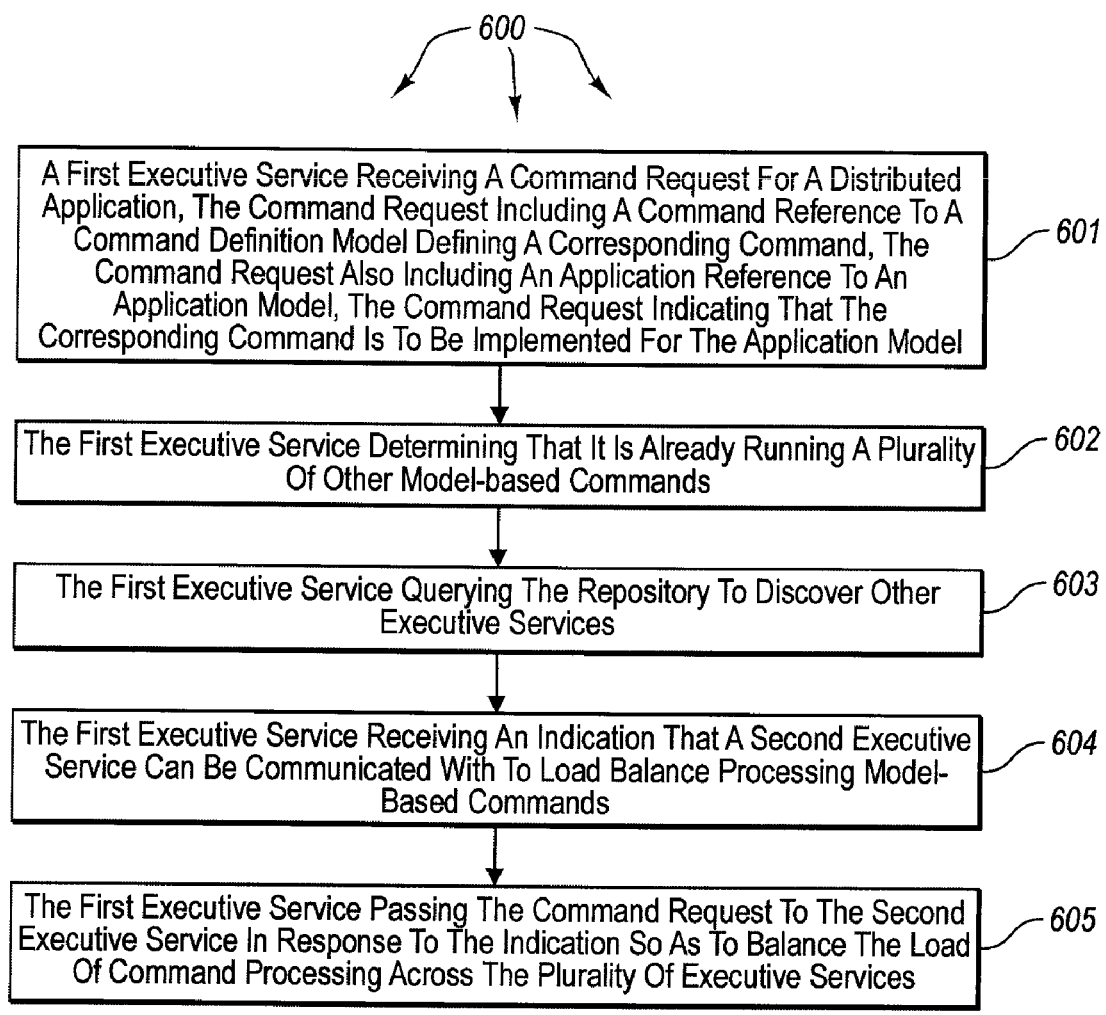
FIG. 6 illustrates a flow chart of an example method for distributing the implementation of a model-based command.

FIG. 6 illustrates a flow chart of an example method 600 for distributing the implementation of a model-based command. Method 600 will be described with respect to the components and data in computer architecture 500.

Method 600 includes an act of a first executive service receiving a command request for a distributed application, the command request including a command reference to a command definition model defining a corresponding command, the command request also including a reference model, the command request indicating that the corresponding command is to be implemented for the application model (act 601). For example, executive service 115 can receive command 129. As previously described, command 129 includes command reference "deploy", that can be used to refer to a command definition model 162A (a model for implementing a deploy command). Command 129 also includes reference 153R to declarative application model 153. Thus, the command request indicates that a deploy command is to be implemented for declarative application model 153.

Method 600 includes an act of the first executive service determining that it is already running a plurality of other model-based commands (act 602). For example, executive service 115 can determine that is already processing a plurality of other model-based commands. Based on the current processing demands, executive service 115 can determine that it lacks available resources to process command 129 and/or that processing command 129 would negatively impact the processing of other commands.

Method 600 includes an act of the first executive service querying the repository to determine if other executive services are available (act 603). For example, executive service 115 can send availability request 501 to repository 120 to determine if other executive services are available. Method 600 includes an act of the first executive service receiving an indication that a second executive can be communicated with to load balance processing model-based applications (act 604). For example, executive service 115 can receive indication 502 that indicates executive service 515 can be communicated with to process model-based commands.

Executive service can communicate with executive service 515 to determine that executive service 515 can process command 129. Method 600 includes an act of the first executive service passing the command request to the second executive service in response to the indication that the second executive service is available so as to balance the load of command processing across the plurality of executive services (act 605). For example, executive service 115 can pass command 129 to executive service 515. Accordingly, the balances the load of command processing across the plurality of executive services in computer architecture 500. Executive service 515 can then process command 129 as previously described.

Further, since executive services share the repository, workflow related commands can be submitted to any of the executive services. For example, executive service 115 can receive command status request 503 including the command ID for a workflow previously created by executive service 515. Executive service 115 can refer to repository 120 to obtain the status of the workflow from a corresponding command record (e.g., updated by executive service 515). Executive service 115 can return the status of the workflow in command status 504. Similarly, cancel command 506 can be issued to executive service 516 to cancel the workflow previously created by executive service 515.

Accordingly, embodiments of the present invention facilitate execution of model-based commands, including software lifecycle commands, using model-based workflow instances. Data related to command execution is stored in a shared repository such that command processors can understand their status in relationship to workflow instances. Further, since the repository is shared, command execution can be distributed and balanced accesses a plurality of different executive services. Embodiments also include model-based error handling and error recovery mechanisms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at computer system that includes a plurality of executive services and a repository that stores models, for distributing the implementation of a command, the method comprising:

an act of a first executive service receiving a model-based command request for a particular distributed application, the first executive service being configured to refine declarative application models, which include one or more sets of high-level instructions expressing application intent for distributed applications, into detailed application models for translation by technology-specific drivers, the model-based command request including a command reference to a particular command definition model defining a corresponding command, the model-based command request also including a reference to a particular declarative application model, the model-based command request indicating that the corresponding command is to be implemented for the particular declarative application model in connection with executing a particular distributed application;

an act of the first executive service determining that it is already running a plurality of other model-based commands;

an act of the first executive service querying the repository to determine if other executive services are available;

an act of the first executive service receiving an indication that a second executive service is available for processing model-based commands, the second executive service also being configured to refine declarative application models into detailed application models; and an act of the first executive service passing the model-based command request to the second executive service in response to the indication that the second executive service is available, so as to balance the load of command processing across a plurality of executive services.

2. The method as recited in claim 1, wherein the act of the first executive service determining that it is already running a plurality of other model-based commands further includes an act of determining that the computer system lacks available resources to process the corresponding command or that processing of the corresponding command would negatively impact processing of the plurality of other model-based commands.

3. The method as recited in claim 1, wherein the act of a first executive service receiving a command request for a distributed application comprises an act of receiving a software lifecycle command request.

4. The method as recited in claim 1, the method further comprising:

an act of a third executive service receiving a request for a status of a workflow instance from a user tool, the status request including a command ID for the workflow instance.

5. The method as recited in claim 4, the method further comprising:

an act of the third executive service using the command ID to refer to a command record for the workflow instance in the repository.

6. The method as recited in claim 5, the method further comprising:

an act of the third executive service accessing a state of the workflow instance from the command record; and an act of the third executive service returning the status to the user tool.

7. One or more storage medium having stored computer-executable instructions which, when executed by one or more processors of a computer system, implement a method for distributing the implementation of a command, the method comprising:

an act of a first executive service receiving a command request for a particular distributed application, the first executive service being configured to refine declarative application models, which include one or more sets of high-level instructions expressing application intent for distributed applications, into detailed application models for translation by technology-specific drivers, the command request including a command reference to a particular command definition model defining a corresponding command, the command request also including a reference to a particular declarative application model, the command request indicating that the corresponding command is to be implemented for the particular declarative application model in connection with executing a particular distributed application corresponding to the particular declarative application model;

an act of the first executive service determining that it is already running a plurality of other model-based commands;

an act of the first executive service querying the repository to determine if other executive services are available;

an act of the first executive service receiving an indication that a second executive service is available for processing model-based commands, the second executive service also being configured to refine declarative application models into details application models; and an act of the first executive service passing the command request to the second executive service in response to the indication that the second executive service is available so as to balance the load of command processing across the plurality of executive services.

8. The one or more storage medium of claim 7, wherein the one or more storage medium comprise the computer system with the computer-executable instructions being stored on system memory of the computer system.

9. One or more storage medium having stored computer-executable instructions which, when executed by one or more processors of a computer system, implement a method for processing a model-based command for a distributed application, the method comprising:

an act of receiving a command request for a distributed application, wherein the command request includes a command reference to a command definition model that defines a corresponding command and that identifies a workflow model, wherein the command request also includes a reference to an application model for the distributed application that is a declarative model that describes the structure and behavior of the distributed application by defining general operations of one or more modules in the distributed application, and wherein the command request indicates that the corresponding command is to be implemented for the application model;

an act of creating a command record for the received command request in the repository, wherein the command record stores information related to implementing the command request;

an act of identifying the workflow model from the command definition model, wherein the workflow model describes how to implement the received command request for the application model by defining a set of pre-defined activities configured to interoperate to implement the command request for the application model;

an act of accessing the workflow model from the repository;

an act of creating an instance of the workflow from the workflow model, wherein the workflow instance has a command ID and includes the set of pre-defined activities configured to interoperate to implement the command request for the application model;

an act of storing the command ID in the command record;

an act of submitting the application model reference to the workflow instance to initiate the workflow instance for the distributed application; and an act of recording information related to the behavior of the workflow instance within the command record as the workflow instance implements the command request for the application model and for the distributed application.

10. The one or more storage medium of claim 9, wherein the one or more storage medium comprise the computer system with the computer-executable instructions being stored on system memory of the computer system.

11. The one or more storage medium as recited in claim 9, wherein the act of receiving a command request comprises an act of receiving a software lifecycle command request selected from among: verify, clean, check, fix, deploy, start, stop, undeploy.

12. The one or more storage medium as recited in claim 9, wherein the act of creating an instance of the workflow comprises an act creating a workflow that includes one or more driver-related activities and one or more state-related activities.

13. The one or more storage medium as recited in claim 9, wherein the method further comprises:
an act of locking the application model while the workflow instance implements the command request for the application model.

14. The one or more storage medium as recited in claim 9, wherein the method further comprises:
an act of receiving a request for the status of the workflow instance from a user tool, the status request include the command ID for the workflow instance;
an act of using the command ID to refer to the command record for the workflow instance;
an act of accessing the state of the workflow instance from the command record; and
an act of returning the status to the user tool.

15. The one or more storage medium as recited in claim 9, wherein the method further comprises:
an act of detecting that the workflow instance has completed; and
an act of updating the command record to indicate the workflow instance completed such that completion of the workflow can be reflected in response to subsequent queries.

16. The one or more storage medium as recited in claim 9, wherein the method further comprises:
an act of recording error information related to execution of the command in the repository;
an act of user tools subsequently accessing the error information to reason about problems with the application model; and
an act of the user tools acting upon the problems to correct the problems.

17. One or more storage medium having stored computer-executable instructions which, when executed by one or more processors of a computer system, implement a method for releasing a command definition model for further use, the method comprising:
an act of receiving a command request for a distributed application, wherein the command request includes a command reference to a command definition model that defines a corresponding command and that identifies a corresponding workflow model, wherein the command request also includes a reference to an application model for the distributed application that is a declarative model that describes the structure and behavior of the distributed application by defining general operations of one or more modules in the distributed application, and wherein the command request indicates that the corresponding command is to be implemented for the application model and for the distributed application;

an act of creating a command record for the received command request in the repository, wherein the command record stores information related to implementing the command request;

an act of creating an instance of the workflow from the corresponding workflow model, wherein the workflow model describes how to implement the received command request for the application model, and wherein the workflow instance includes a set of pre-defined activities configured to interoperate to implement the command request for the application model;

an act of locking the application model to prevent further access to the application model while the workflow instance implements the command request for the application model;

an act of submitting the application model reference to the workflow instance to initiate the workflow instance for the application model;

an act of recording information related to the behavior of the workflow instance within the command record as the workflow instance implements the command request for the application model for the application model;

an act of determining that the workflow instance is to be stopped;

an act of determining that the workflow instance is stopped; and an act of releasing the lock on the application model such that other commands can be implemented for the application model.

18. The one or more storage medium of claim 17, wherein the one or more storage medium comprise the computer system with the computer-executable instructions being stored on system memory of the computer system.

19. The one or more storage medium as recited in claim 13, wherein the act of determining that the workflow instance is to be stopped comprises:
an act of receiving a subsequent cancel call requesting that the workflow instance be stopped prior to the workflow instance completing implementation of the command request for the model application; and
an act of issuing a stop request to the workflow instance.

20. The one or more storage medium as recited in claim 16, wherein the act of receiving a subsequent request to stop the workflow instance comprises:
an act of determining that the cancel call is not responding; and
an act of receiving a terminate call requesting that the workflow be terminated in response to the determination that he cancel call is not responding.

* * * * *